(12) United States Patent
Melcher (10) Patent No.: US 6,425,030 B1
(45) Date of Patent: Jul. 23, 2002

(54) SERIAL DATA-AND CONTROL-BUS WITH DISTRIBUTION VOLTAGE

(75) Inventor: Domenic Melcher, Uster (CH)

(73) Assignee: Menico AG, Uster (CH)

( * ) Notice: Subject to any disclaimer, the term of this patent is extended or adjusted under 35 U.S.C. 154(b) by 0 days.

(21) Appl. No.: 09/284,363

(22) PCT Filed: Oct. 9, 1998

(86) PCT No.: PCT/CH98/00433

§ 371 (c)(1),
(2), (4) Date: Sep. 22, 1999

(87) PCT Pub. No.: WO99/27461

PCT Pub. Date: Jun. 3, 1999

(30) Foreign Application Priority Data

Nov. 19, 1997 (CH) .............................................. 2671/97

(51) Int. Cl.[7] .............................................. G06F 13/00
(52) U.S. Cl. ...................................... 710/110; 710/106
(58) Field of Search ................................. 710/110, 106, 710/316; 370/360, 362, 365, 503; 375/219, 295, 297, 316, 328; 714/43; 326/80, 81, 82, 83–86

(56) References Cited

U.S. PATENT DOCUMENTS

| | | | | |
|---|---|---|---|---|
| 4,357,605 A | | 11/1982 | Clements | 340/825.14 |
| 4,497,391 A | * | 2/1985 | Mendelsohn et al. | 187/380 |
| 4,558,316 A | * | 12/1985 | Yong | 340/825.06 |
| 4,583,091 A | | 4/1986 | Sugiura et al. | 340/825.59 |
| 4,770,842 A | | 9/1988 | Kelly et al. | 376/216 |
| 5,182,745 A | * | 1/1993 | Heichler | 370/85.1 |
| 5,696,777 A | * | 12/1997 | Hofsaess | 714/820 |

FOREIGN PATENT DOCUMENTS

| | | | |
|---|---|---|---|
| EP | 0146045 A2 | * | 6/1985 |
| EP | 0540449 | * | 5/1993 |
| EP | 0728621 | * | 8/1996 |

OTHER PUBLICATIONS

*International Search Report,* Jan. 29, 1999, 2 pgs.

* cited by examiner

*Primary Examiner*—Peter Wong
*Assistant Examiner*—X. Chung-Trans
(74) *Attorney, Agent, or Firm*—Jenkens & Gilchrist, P.C.

(57) ABSTRACT

A bus system for the serial transmission of digital data with a multiplicity of individual addressable bus transceivers (BT), which are connected by an only two-wire common bus, via which both synchronising signals and also digital data and energy are exchanged between the BTs. As the value of a bit, The result of an elementary logical operation (AND or OR) on the values of all simultaneously transmitting BTs with the same address is transmitted to all the receiving BTs with the same address simultaneously. Each BT includes its own time control and synchronising circuit with a time base, a bit counter, a byte counter and a comparator. With an identity between the imprinted address and that appearing on the bus a byte of digital data is transmitted serially via an I/O port The bus system can be put into operation and operated without the use of software, whereby polarisation errors in installation are excluded.

8 Claims, 9 Drawing Sheets

(SLAVE)

FIG. 10

SERIAL DATA-AND CONTROL-BUS WITH DISTRIBUTION VOLTAGE

The present invention relates to a bus system for the transmission of digital test data or control commands. Several such bus systems are known and differentiate themselves from each other by the type of transmission, the addressing, the number of conductors and the energy transmitted.

A large major group of bus systems are concerned with the parallel transmission of data. They are not considered further here, since they are not relevant with regard to the present invention. The second large major group works with serial transmission of the data and represents the state of the technology.

In the narrow sense, the state of the technology is formed from systems in which a multiplicity of participants of an active or passive nature (so-called Bus-Transceivers, BT) are connected to the actual data bus.

Such bus systems are known, for instance, from EP 0 146 045 A2 (henceforth D1), U.S. Pat. No. 4,497,391 (henceforth D2), EP 0 540 449 A1 (henceforth D3) and EP 0 728 621 A2 (henceforth D4).

D1 describes a carrier frequency system in which a normal electronic supply conductor is used as the data bus. In D2, a lift control is described that connects on one side the stationary selector stations, on the other the selector station in the lift via two four-wire systems—in the sense of the definition chosen here of all Bus Transceivers (BT)—with the actual lift controller or main station. The addressing is effected by means of a time slot system, wherein each BT is allocated a certain time-defined address twice in each address cycle, the first time for the transmission of signals from BT to the main station and the second time for the reverse direction.

From D3, a fast data connection system is known essentially for application in and by computer systems. The system of D3 is especially optimised for high transmission speeds. The data transmission of each BT is effected separated in time according to sending and receiving; even so, a multiplicity of conductors are provided for the data bus.

The multiplicity of conductors are always brought together in pairs for the formation of a differential signal.

Further, a bus system developed for application in motor vehicles is known from D4. The bus system of D3 has a data transmission based on pulse height selection, whereby the transmitted information is encoded using pulse width modulation and has a higher voltage level than the supply voltage of the single wire bus system. The zero reference voltage is essentially the potential of the vehicle chassis as the return conductor to the battery. A further feature in accordance with the invention is the trapezoidal type current pulse shape for the reduction of discontinuous transitions.

Each of the four systems listed here as examples has its own characteristics and is designed for special applications. The use of one system in the typical application area of another generally leads to great difficulties. Further, in all the documents quoted, systems are presented, which—including the power supply—require at least three conductors and in all cases have BT installed by specialists (which nonetheless does not exclude installation faults; see D2).

An aim addressed by the present invention is provision of a bus system for serial transmission of digital data with a multiplicity of single addressable BTs. The multiplicity of single addressable BTs are connected by only one two wire common bus. The one two wire common bus can provide the energy supply of the BTs as well as the users connected to them at any time. It is possible with the one two wire common bus to transmit from precisely one transmitting BT simultaneously to two or more receiving BTs and to transmit the result of a logical element operation, that is the current logical sum (OR Gate) or the current logical product (AND Gate), of the digital data from two or more simultaneously transmitting BTs, simultaneously to one or more or even several receiving BTs at the same time. This bus system can thereby be set into operation and operated without the use of software and additionally can be designed such that polarity errors are excluded.

Shown are:

FIG. 1 a representation of the principles of the bus system in accordance with the invention, FIG. 2 a spatial grouping of the BT in accordance with the invention, FIG. 3 the block circuit diagram of a master BT 1, FIG. 4 the block circuit diagram of a slave BT 5, FIG. 5 the block circuit diagram of a modification of the slave BT 5 with reversed polarity protection, FIG. 6 the voltage curve against time between the two conductors 2, 3 of the bus 4 during transmission of a normal data bit, FIG. 7 the voltage curve against time between the two conductors 2, 3 of the bus 4 during transmission of the last data bit of a cycle with a synchronising signal S, FIG. 8 the block circuit diagram of a form of construction of the BT in accordance with the invention with an I/O port, FIG. 9 the detailed circuit diagram of a BT in the function of Master BT 1, FIG. 10 the detailed circuit diagram of a BT in the function of Slave BT 5.

Since the different forms of construction of the functional groups applied here are known and familiar to every specialist, these are only specified in detail in individual cases to the level of elementary basic circuit elements.

Figure 1:
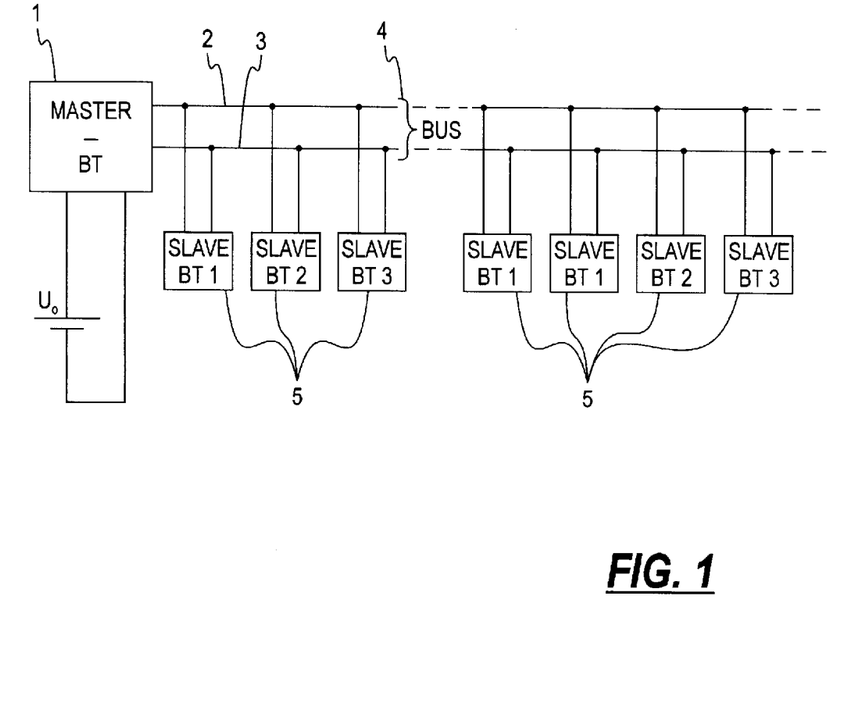

In FIG. 1, a representation is shown of principles of the bus system in accordance with the invention. A master BT 1 is connected to a direct current voltage source 9 with a voltage Uo and delivers both electrical energy and timing information to a bus 4 comprising two conductors 2, 3. A multiplicity of slave BTs 5 are connected in parallel to the bus 4. The two conductors 2, 3 can comprise two individual wires, but also can comprise one wire and a metal chassis of a vehicle. Each BT has its address stored in coded form. At least two BTs always have the same address.

Figure 2:
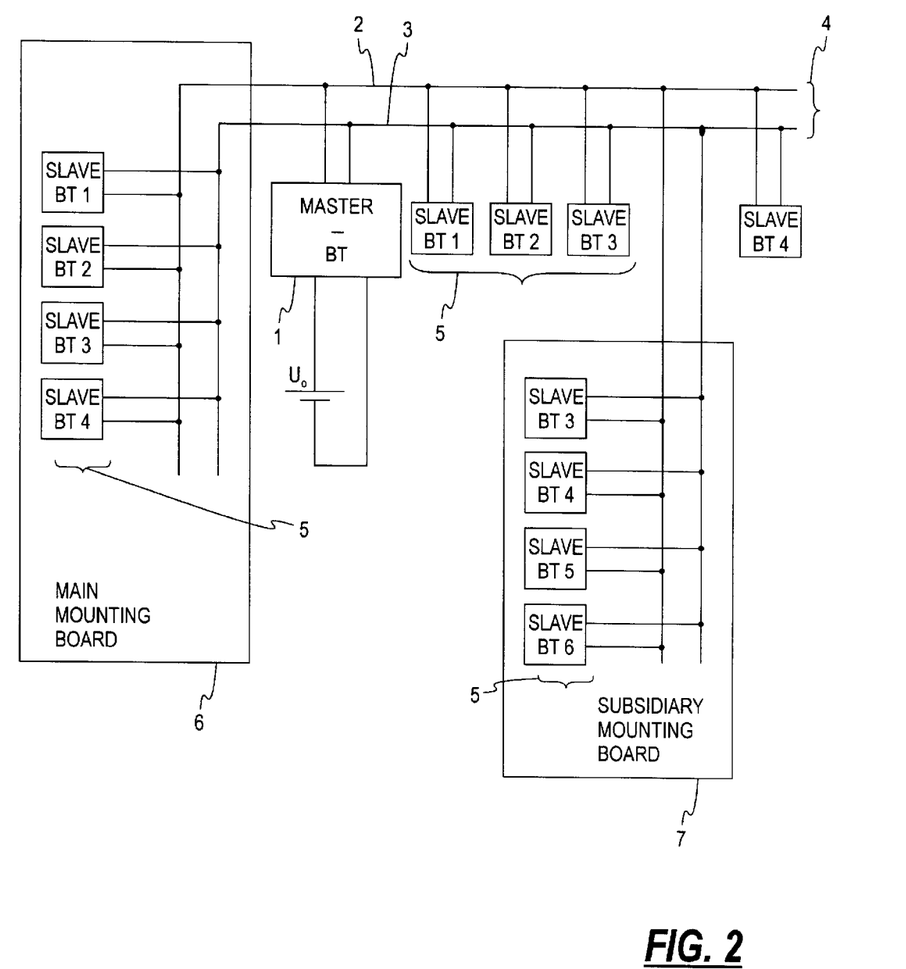

FIG. 2 shows schematically a spatial grouping of the BT in accordance with the invention. For instance, a main mounting board 6 and a subsidiary mounting board 7 are provided. The BTs arranged on a mounting board 6, 7 or otherwise accessible to the user are as a rule connected to input equipment, such as keys or switches, or to monitors to indicate test values or conditions, etc. . . Other BTs, which as a rule are not immediately accessible to the user, are connected to actuators, switches, sensors or similar items.

The BTs discharge monitoring, measurement, and control functions. They transmit digital coded information, such as INPUT/OUTPUT conditions, test values, or control commands. Each of the BT that are not immediately accessible is as a rule a BT on the main mounting board 6 and, for instance in a selection therefrom, allocated to a BT on the subsidiary mounting board 7. Allocated means, that these BTs are implanted with the same address. Each BT can, if required, be configured either as a transmitter or a receiver, as explained in more detail below.

Figure 3:
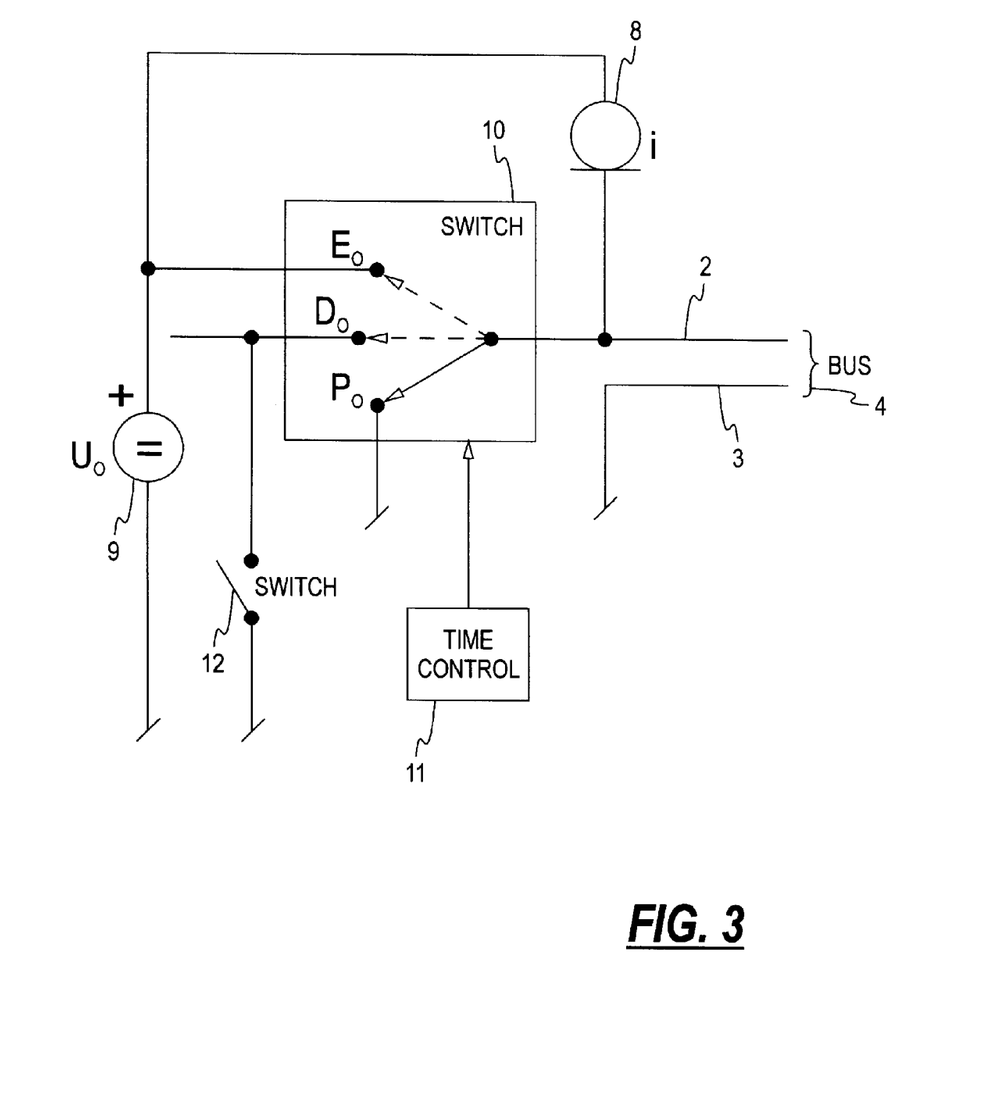

FIG. 3 shows a block circuit diagram of a master BT 1. On the conductor 2 of the pair of conductors 2, 3 lies a direct current source 8, which lies on the direct current voltage source 9 with voltage Uo. The second conductor 3 lies at the null potential. A switch 10 is realised by electronic means connects, under the influence of the time control 11, for each individual data bit to be transmitted, sequential connections Po, Do and Eo to the conductor 2. The pole Po is fixed constantly at the null potential. As long as the conductor 2 is joined to the pole Po, the two conductors 2, 3 are thus effectively short circuited, whereby a pause signal P with the value 0 is applied to the bus 4.

A further switch 12, also realised by electronic means, determines the potential on which the pole Do lies. If a data bit with the value 0 is to be transmitted at a specified point in time from the master BT(which is configured as a transmitter), the switch 12 is closed and the connection Do lies at the null potential. The two conductors 2, 3 of the bus 4 are thereby short circuited. If, on the other hand, the master BT 1 is configured, for the current bit, as a receiver, the switch 12 remains open and the master accepts the value of the bit on the bus 4.

During the period of a data signal D following the pause signal P, the two conductors 2, 3 are thus similarly short circuited, in as much as a data bit with the value 0 is transmitted from the master BT 1. The direct current source 8, which for greater interference suppression delivers a relatively high current i in the order of magnitude of, for instance, 100 mA, determines the idle potential on the conductor 2 during the switch position Do. If a data bit with the value 1 is to be transmitted, the conductor 2 is not short circuited. The direct current source 8 pulls the conductor 2, after any loading capacities have been reversed in charge, to the potential of the direct current voltage source 9. Following on the data signal D, the conductor 2 is connected to the pole Eo, which is connected to the positive pole of the direct current voltage source 9. The voltage Uo lies on the conductor 2, which corresponds to an energy signal E on the bus 4, or a synchronising signal S, which will be discussed in more detail below. The conductivity of the conductors 2, 3 must obviously be matched to the current strength selected for the individual application.

Figure 4:
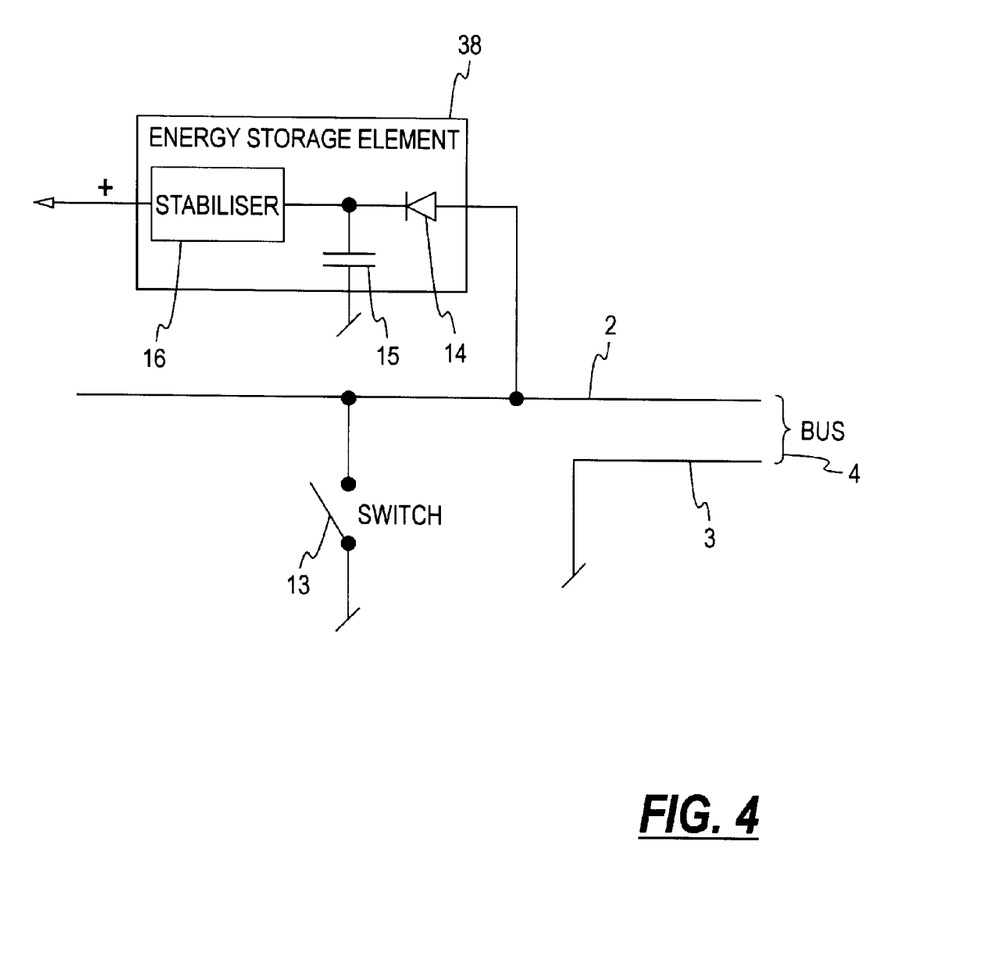

FIG. 4 shows the block circuit diagram of a slave BT 5. Instead of the switch 12 as in the master BT 1, a corresponding switch 13 is present, similarly achieved by electronic means. If, at a given point in time, a data bit with the value 0 is to be transmitted from a slave BT 5 configured as a transmitter, the switch 13 is closed. The pair of conductors 2, 3 of the bus 4 are thereby short circuited. If, on the other hand, the slave BT 5 is configured as a receiver, this switch 13 remains permanently open, and the slave BT 5 accepts the value of the bit on the bus 4 at that point of time. If the value of the applied bit is equal to 1, the current I of the direct current source 8 is led to the energy storage element 38 described below.

The slave BT 5 includes such an energy storage element 38, which is realised in that the conductor 2 of the bus 4 is connected to a diode 14 in its conducting direction and whose output is applied to a storage capacitor 15. If an energy signal E or a synchronising signal S is applied to the conductor 2, the storage capacitor 15 is charged. A stabiliser 16 similarly attached to this storage capacitor 15 delivers a stabilised voltage of, for instance 5V, at its output. The stabiliser 16 is used to feed the slave BT 5 as well as to supply the load connected to this slave BT 5. Obviously, a direct energy supply to the slave BT 5 would be possible. For this purpose, however, an additional two wire feeder from a source of electrical energy to the slave BT 5 would have to be installed. A substantial advantage of the invention, namely, that the energy for each BT and each load connected to it is also delivered via the bus, would thereby be unused.

If now only one of the various mutually allocated BTs closes its switch 13, or the switch 12 in the case of the master BT 1, the bus is short circuited, which in positive logic corresponds to a logical product (i.e., a wired logical AND gate or "wired AND"). All the switches 13, or 12, of all the BTs connected with the same address must be open, so that a positive voltage(i.e., a logical 1), appears on the bus 4. If, conversely, also in only one BT with the same address this switch 13, or 12, is closed, the bus 4 is short circuited, which in negative logic corresponds to a logical sum, that is a wired logical OR Gate ("wired OR"). No voltage(i.e., a logical 0) thereby appears on the bus 4. These two logical element components make it possible, for instance, to cause an effect on the same receiver, for instance a relay, from different control units.

Figure 5:
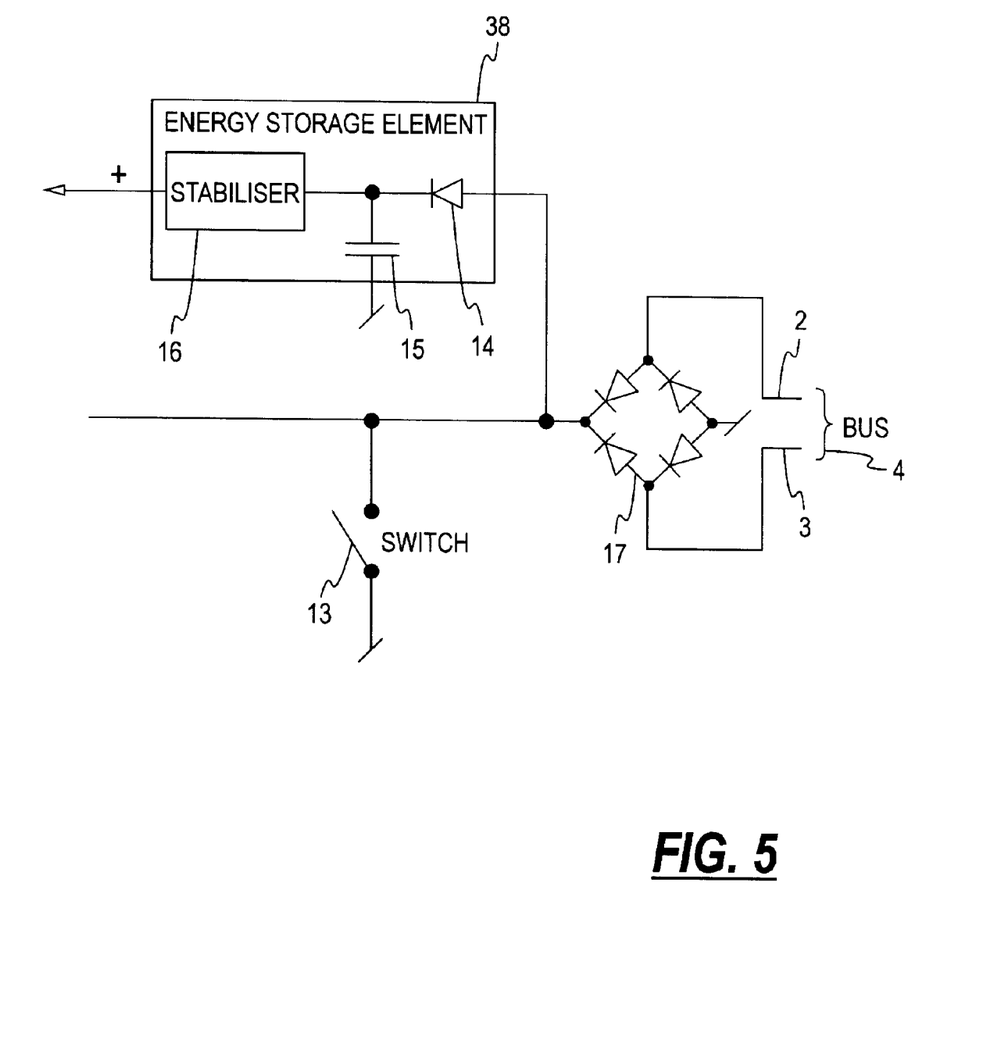

In FIG. 5, the block circuit diagram of a modification of a slave BT 5 is shown, with polarity protection. This modification differs from the version shown in FIG. 4 only in that the conductors 2, 3 of the bus 4 are not joined directly to the slave BT 5, but via a full-wave rectifier 17. It is thereby ensured that no polarity errors can arise in the installation of the bus system in accordance with the invention. Elimination of potential polarity errors correspondingly eases the installation.

Figure 6:
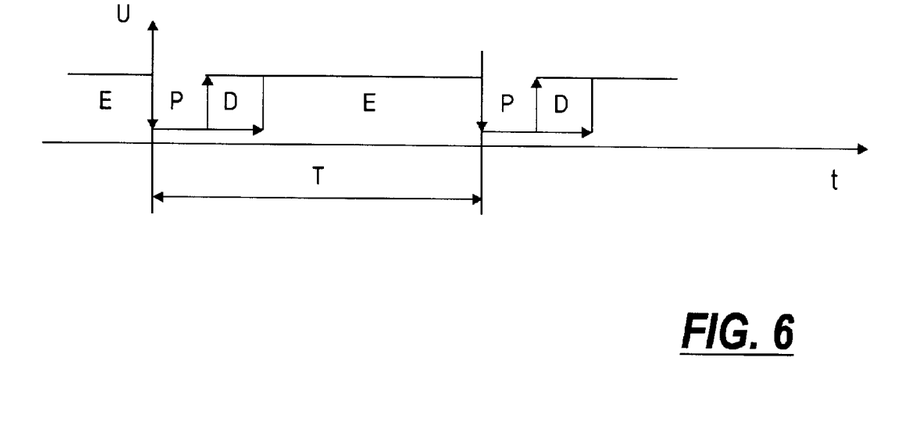

FIG. 6 shows the idealised voltage curve between the two conductors 2, 3 of the bus 4 during the transmission of a normal data bit. Following the transmission of a first synchronising signal S by the master BT 1, the BTI acts to place, under the control of its timing control, a cyclically recurring train of identical bits. Each of these bits thereby requires a bit-time interval T. This bit-time interval T can be prechosen in principle as desired within the technical limits. The reciprocal of the bit-time, 1/T is the upper limit of the possible transmission rate using the bus system. The number of bits within a cycle is in theory as desired However, number of bits within the cycle is preferably equal to a power of 2 (i.e., $2^n$), , such as, for example, $2^{10}$=1024.

Following the completion of these 1024 sequential bits or, in modifications, a whole multiple of this, a new cycle begins with a new synchronising signal S. In this form of construction, the pause signal P at the beginning of a bit and the immediately following data signal D, lasts in each case for a sixth of the bit-time interval T. The energy signal E following the data signal D lasts for the remaining two thirds of the bit-time interval T. Obviously, however, other divisions of the bit time interval T into the three different signals P, D and E of a bit are similarly in accordance with principles of the invention.

Figure 7:
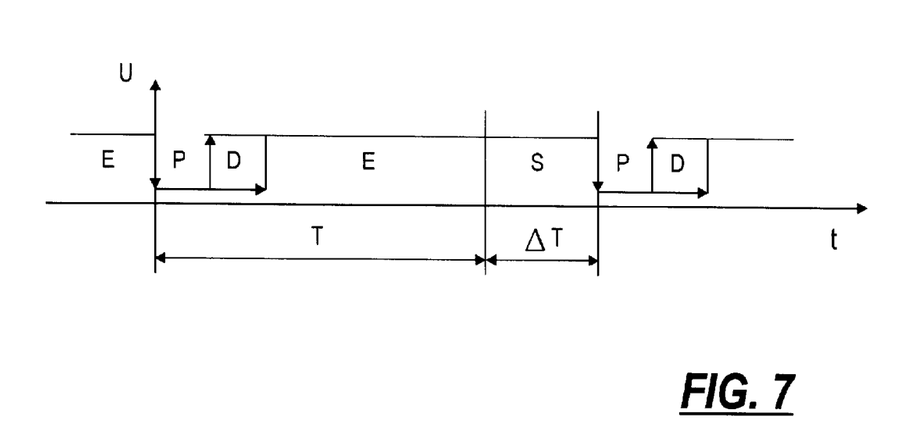

FIG. 7 shows the idealised voltage curve against time between the two conductors 2, 3 of the bus 4 during the transmission of the last bit of a cycle with a synchronising signal S. Instead of the normally occurring pause signal P as the beginning of the following bit, a synchronising signal S follows. The synchronising signal S marks the start of the following cycle. The duration ΔT of the synchronising signal S amounts in this form of construction to a third of the Bit interval time T. A different duration of this signal is similarly in accordance with principles of the invention.

The synchronising signal S is again followed by a first pause signal P of the first bit in the new cycle, or, in the quoted modifications, of a first pause signal P in the first cycle of a whole number of following cycles. Each bit has a falling and rising edge. The falling edge, which occurs at the start of each pause signal P, defines the start of a new bit.

Figure 8:
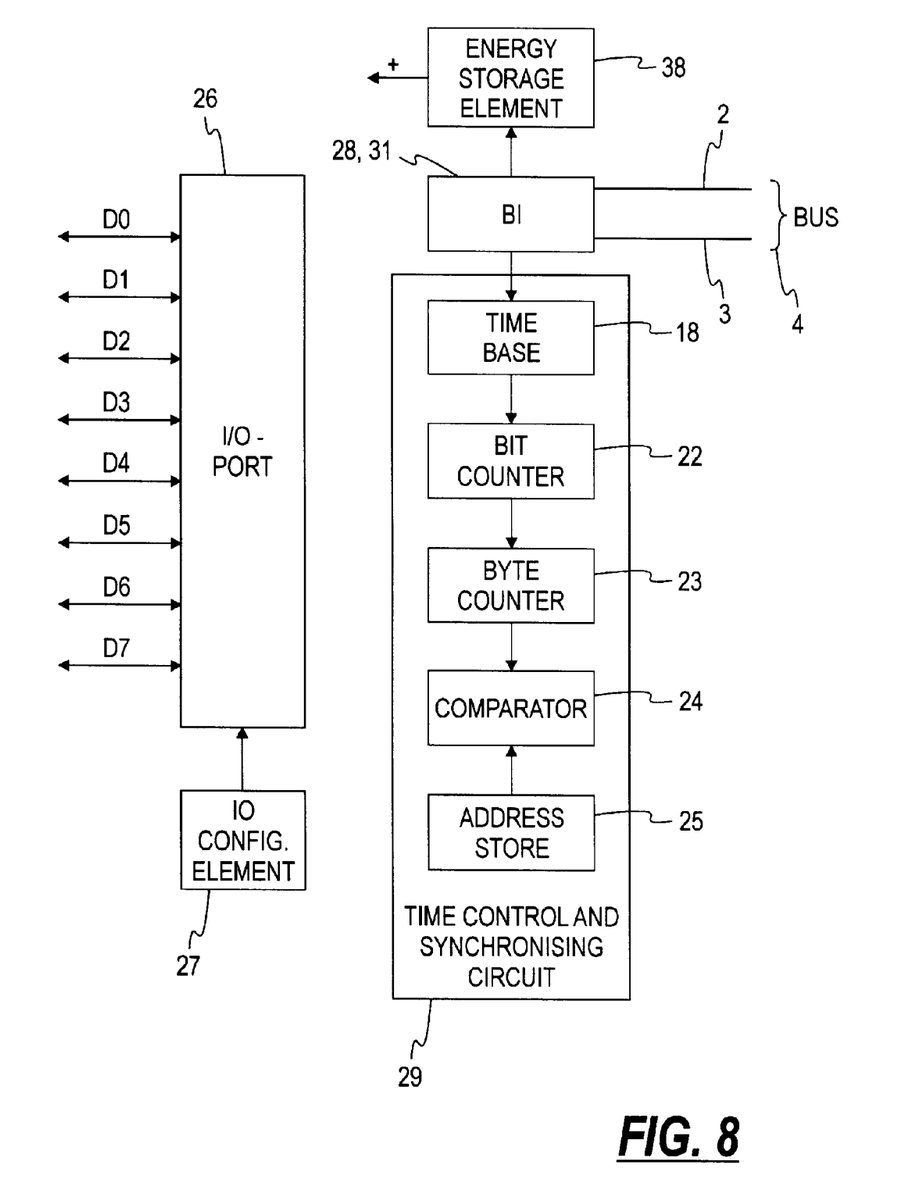

FIG. 8 shows the block circuit diagram of a form of construction of a BT, which is essentially the same for all BTs. In other words, the BT is essentially the same both for the master BT 1 and also for the remaining Slave BTs 5. The energy storage element 38 and its function have already been described under FIGS. 4 and 5, and are therefore not discussed here.

Each BT includes an I/O port 26, a bus interface 28 or a master-bus-interface 31, a time control and synchronising circuit 29, and an I/O configuration element 27. The I/O port 26, the bus interface 28 or the master-bus-interface 31, the time control and synchronising circuit 29, and the I/O configuration element 27 are all connected together and with the bus 4 in a suitable fashion. The I/O port 26 has a number of parallel inputs and outputs. The number of these inputs/outputs can in theory be specified as desired, but is however for practical reasons typically a power of two (e.g., $2^3$).

If, for example, bytes each with 8 bits are to be transmitted, 8 of the 1024 bits of a complete cycle are required, whereby a maximum possible number of 1024/8= 128 different addresses result in the BT. By setting the configuration of the I/O configuration element 27, the 8 bits can be configured bitwise as a transmit or receive bit and also divided as desired, for instance, into 1×2 bits and 1×6 bits, or also, similarly, for instance, into 2×4 bits, so that within a byte length, the transmission of two 4-bit pieces of information is possible. The I/O port 26 further includes the storage elements necessary for the storage of these 8 bits, as well as, in a modification, comparison elements for the comparison of corresponding values D0–D7 from two immediately-following cycles.

These storage and comparison elements are not separately shown, since they correspond to the known state of the technology. In this modification of the I/O port 26 via the I/O configuration element 27, for fault free transmission the elements are configured for doubled transmission: a change of the values D0 to D7 is then only transmitted at the I/O port 26 following two cycles in which each corresponding value agrees.

The I/O port 26 is connected to the bus 4 via the bus interface 28, or via the master bus interface 31. The time controlling and synchronising circuit 29 includes a time base 18, a bit counter 22, a byte counter 23, an address store 25, and a comparator 24. The time base 18, the bit counter 22, the byte counter 23, the address store 25, and the comparator 24 are similarly all interconnected and connected to the bus 4 in a suitable fashion. In particular, the time base 18 is connected via the bus interface to the bus 4. The synchronising signal S present on the bus 4 is captured by each slave BT 5 at the beginning of a cycle and the necessary reset 34 or master reset 35 signal is generated. The time base 18 associated withand the counter (i.e., the bit counter 22 and the byte counter 23) connected to the reset signal are reset to null. This process is further considered in the description under FIG. 10.

Both the byte counter 23 and also the address store 25 are connected to the comparator 24. The comparator 24 compares the freely pre-selected address in the address store with the content of the byte counter 23. If the contents of the freely pre-selected address in the address store and the byte counter 23 agree, the next 8 bits on the bus 4 are transmitted to all the BTs with this specific address in the following time slot whose duration corresponds to 8 bit time intervals T.

Whether these 8 bits are transmitted or received is controlled by the similarly pre-selected I.O configuration element 27. The address store 25 and the I/O configuration element 27 can be realised using, for example, DIP 8 switches, or by the circuit created by the positions of various static short circuit plugs. At least one of the various short circuit plugs is decisive for the configuration of the BT as a transmitter or receiver. It is also in accordance with principles of the invention to enter addresses or I/O configurations dynamically in a multiplex mode via at least one additional pin, which is available in all BTs, and to configure the BT as a transmitter or receiver. The process of so dynamically entering addresses is well known to the specialist.

FIG. 8 basically describes the construction of the master BT 1, which, however, as the directly supplied main station has no energy supply element 38. Further differences exist in the Bus Interface: the bus interface 28 is replaced in the master BT 1 by the master bus interface 31, which has already been discussed in the description of FIG. 3 and FIG. 4.

Figure 9:
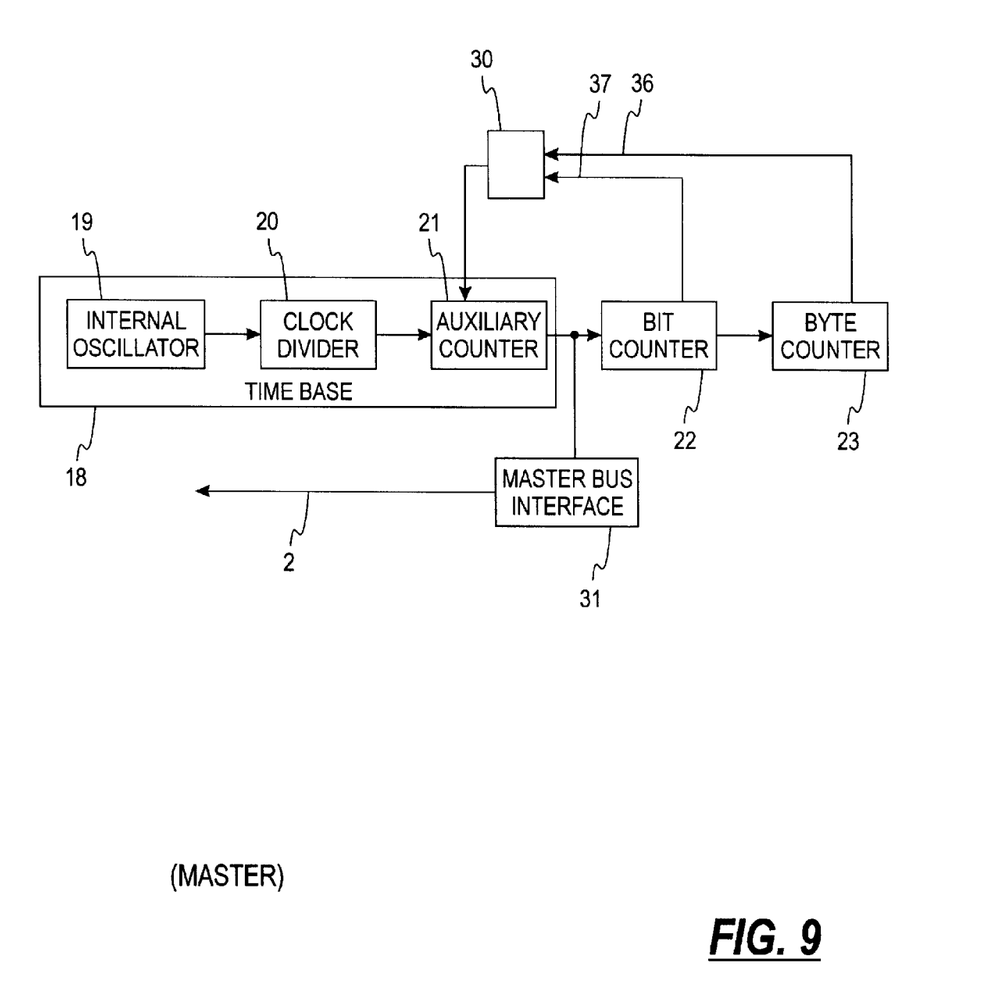

In FIG. 9, the detailed circuit diagram of a BT in the function of master BT 1 is given. The master BT 1 includes a time base 18, which includes an internal oscillator 19, a clock divider 20, and an auxiliary counter 21. The oscillator 19 operates for instance at a frequency of 1 MHz. Obviously, in theory any other frequency is possible. The frequency is determined by the choice of bit interval time T, the desired number of possible addresses in the bus system, as well as by the desired number of bits per I/O port 26. In the clock divider 20, which follows the oscillator 19 in the circuit, the frequency of the oscillator 19 is, for instance, halved five times (i.e., reduced to $\frac{1}{32}$ of the oscillator frequency). The number of frequency halvings depends on the one hand on the oscillator frequency, and on the other on the bit frequency aimed at on the bus 4.

The output of the clock divider 20 is applied to the input of the auxiliary counter 21. The auxiliary counter 21 has two alternative settings: in the normal case of a customary bit it divides the frequency of its input signal by 6. The periodic duration of the signal at its output thus corresponds to the bit interval time T, as shown in FIG. 6. The output of the auxiliary counteroutput is connected to the input of the bit counter 22, which again divides the frequency of the signal at its input by 8.

The output of the bit counter 22 is applied to the input of the byte counter 23, which divides the frequency of its input signal once more (here by 128). After running through a whole number of cycles, each of 1024 bits, a logical 1 appears both at the further Most Significant Bit available output 37 of the bit counter and also at the further available Most Significant Byte output 36 of the byte counter. These two outputs 37 and 36 are connected to the inputs of an AND gate 30, which generates the logical product of these two inputs. The output of the AND gate 30 is applied to a further input available on the auxiliary counter 21.

If a logical 1 appears at the further input, the auxiliary counter 21 switches so that it no longer divides the frequency at its input by 6, but by 8. The duration of the period and thereby the duration of this special bit is extended by the time interval ΔT. The output of the auxiliary counter 21 is connected to the master bus interface 31, whose output is applied to conductor 2 of the bus 4. Thereby, following the energy signal E, the synchronising signal S shown in FIG. 7, which could also be described as an energy signal E extended by the time interval ΔT, appears on the bus 4.

Figure 10:
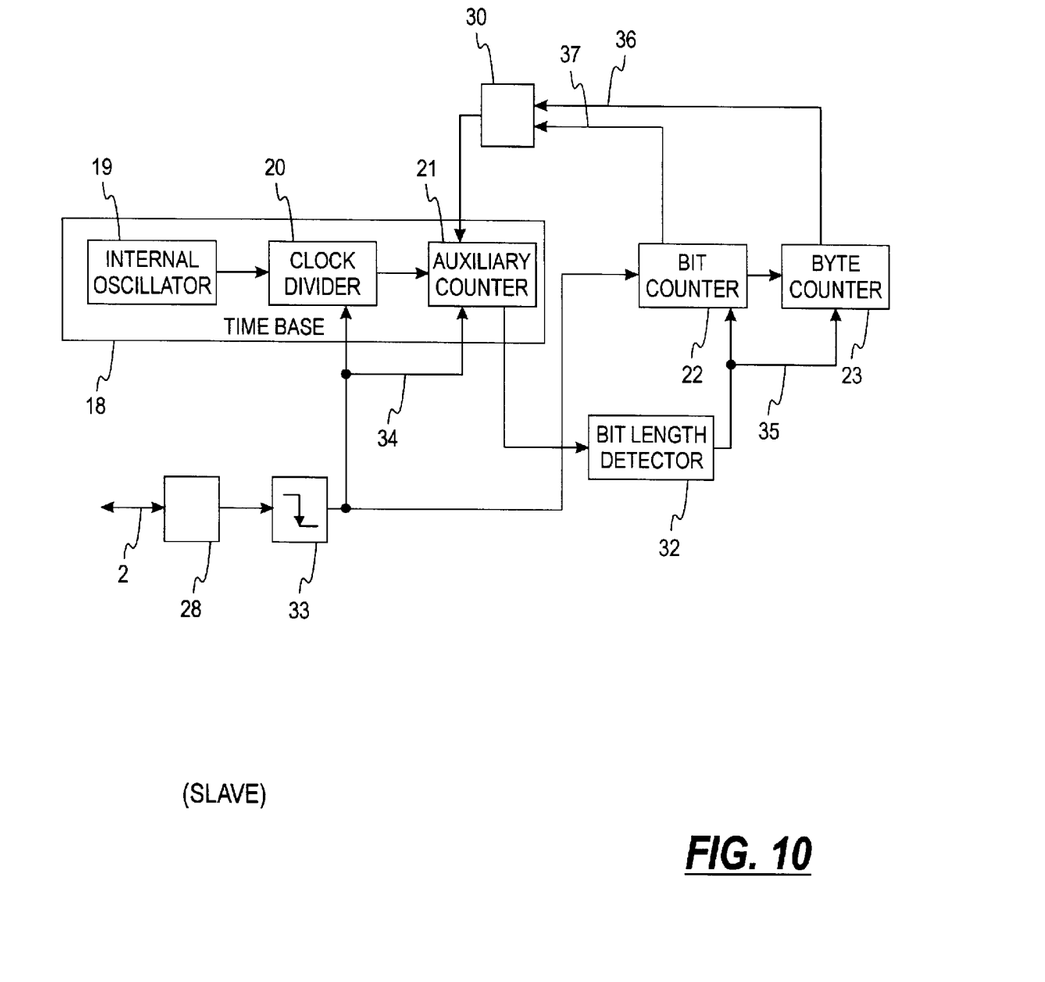

In FIG. 10 the detailed circuit diagram of a BT in the function of a slave BT 5 is presented, which has essentially the same elements as the master BT 1. Differences from the master BT 1 consist of the following: 1) instead of the master bus interface 31, a modified bus interface 28, already described above, is used; and 2) each slave BT 5 includes two further elements in addition to the elements mentioned in the description of FIG. 9. These additional elements are a negative edge end detector 33 and a bit length detector 32. The input of the negative edge end detector 33 is connected to the bus interface 28 and generates a Reset signal 34 at its output at the beginning of the pause signal P applied to the bus 4.

Both the clock divider 20 and the auxiliary counter 21 have, as is customary in every counter, inputs via which these counters 20, 21 can be reset to null. The output of the negative edge end detector 33 is connected to these inputs. At the beginning of each bit, both the clock divider 20 and the auxiliary counter 21 are reset to null in this manner. Instead of the output of the auxiliary counter 21, the output of the negative edge end detector 33 is applied here to the bit counter 22 and thereby effects a synchronous switching increase to the bit counter 22 and the Byte counter 23, since the clock signal for the slaves is transmitted in the form of the negative edge via the bus 4.

The output of the auxiliary counter 21 is applied to the input of the bit length detector 32. The time base 18 is required here for time measurement, with the aid of which the bit length detector 32 determines whether a normal bit or a bit extended by the synchronising signal S (i.e., a bit lengthened by the time interval $\Delta T$) is present on the bus. If the latter is the case, the bit length detector 32 generates a master reset signal 35 at its output. This output is connected to the inputs available both on the bit counter 22 and the byte counter 23, by which these counters 22, 23 can be reset. If, therefore, a synchronising signal S appears on the bus 4, in all the slave BTs 5 both the bit counter 22 and also the byte counter 23 are reset to null.

Due to the largely-identical construction of the master BT 1 and the slave BT 5, in a modification, a basic form of a BT, which includes all the components both of the master BT 1 and also of the slave BT 5, can be put together using a few simultaneously operating switches, realised electronically or mechanically, thus switched as a master BT 1 or a slave BT 5, so that the currently not required elements are switched out, and inputs and outputs of the different elements are assembled in the desired form as described above.

It is obviously also in accordance with principles of the invention to integrate a part or all of the components required for a BT onto a single chip. This can, as is generally known, for instance, using operational amplifiers, be configured as master BT 1 or slave BT5, and each used as a transmitter or receiver by the simplest external circuitry.

Due to the characteristics presented above, the bus system in accordance with principles of the invention is especially suited to a multiplicity of applications, in which the transmission times do not need to be extremely short (e.g., they can even be in the order of magnitude of human reaction times of some tenths of a second), while at the same time the wiring outlay should be kept small. A typical example of this is the wiring of a ship: the transmission, for instance, of fuel level to a display, or the transmission of commands for the switching on or off of motors or other loads is not time critical as a rule in this intrinsically sluggish system. Further typical examples are the wiring for aircraft and vehicle electrical systems, for instance for the display of closed conditions of doors, for the transmission of commands for the adjustment of lights, or for many similar purposes.

As a further application, a bus system in accordance with the invention can be applied for the control of lifts, and indeed both in the fixed and the moving selection stations. The great advantages as against conventional controls are clear. But also in many simpler applications, as, for instance, in the wiring of house bells in a multi-family house, the use of the bus system in accordance with principles of the invention permits a reduction in the overall outlay, here for instance all the bell transformers can be saved and at the same time the wiring outlay massively reduced.

What is claimed is:

1. A device for controlling a bus, the device comprising:
   a three position switch, the three position switch comprising a first input, a second input, a third input, and an output connectable to a bus;
   an energy receiving means connected to the first input, the second input, and the output; and
   a data switch connected intermediate the second input and a null potential, the data switch having an open position and a closed position;
   wherein the third input is connected to the null potential, and wherein a pause signal can be applied at the output responsive to the three position switch being in the third position, and wherein a first data bit can be applied at the output responsive to both the three position switch being in the second position and the data switch being in the open position, and wherein a second data bit is applied at the output responsive to both the three position switch being in the second position and the data switch being in the closed position, and wherein a synchronizing signal is applied at the output responsive to the three position switch being in the third position.

2. The device of claim 1, wherein the output is further configurable to receive data responsive to the data switch being in the open position.

3. The device of claim 1, further comprising:
   a time controller connected to the three position switch;
   wherein the time controller is configured to control the three position switch.

4. The device of claim 1, further comprising:
   a direct current source connected to the output.

5. A device for controlling a bus, the device comprising:
   a three position switch, the three position switch comprising a first input, a second input, a third input, and an output connectable to a bus;
   an energy receiving means connected to the first input, the second input, and the output, the energy receiving means for receiving energy with a first potential; and
   a data switch connected intermediate the second input and a second potential, the data switch having an open position and a closed position;
   wherein a pause signal can be applied at the output responsive to the three position switch being in the third position, and wherein a first data bit can be applied at the output responsive to both the three position switch being in the second position and the data switch being in the open position, and wherein a second data bit is applied at the output responsive to both the three position switch being in the second position and the data switch being in the closed position, and wherein an energy signal is applied at the output responsive to the three position switch being in the third position.

6. The device of claim 5, wherein the output is further configurable to receive data responsive to the data switch being in the open position.

7. The device of claim 5, further comprising:
   a time controller connected to the three position switch;
   wherein the time controller is configured to control the three position switch.

8. The device of claim 5, wherein the second potential is a null potential.

* * * * *